(12) United States Patent
Kushwaha et al.

(10) Patent No.: US 7,343,408 B2
(45) Date of Patent: Mar. 11, 2008

(54) SYSTEM AND METHOD FOR WIRELESS DATA TERMINAL MANAGEMENT USING TELECOMMUNICATION SIGNALING NETWORK

(75) Inventors: Rakesh Kushwaha, Marlboro, NJ (US); Badri Nath, Edison, NJ (US)

(73) Assignee: Mformation Technologies, Inc., Edison, NJ (US)

( * ) Notice: Subject to any disclaimer, the term of this patent is extended or adjusted under 35 U.S.C. 154(b) by 664 days.

(21) Appl. No.: 10/022,902

(22) Filed: Dec. 20, 2001

(65) Prior Publication Data

US 2002/0069259 A1 Jun. 6, 2002

Related U.S. Application Data

(63) Continuation-in-part of application No. 09/925,536, filed on Aug. 10, 2001.

(60) Provisional application No. 60/251,034, filed on Dec. 5, 2000.

(51) Int. Cl.
*G06F 15/173* (2006.01)
(52) U.S. Cl. .................. 709/224; 709/223; 710/10
(58) Field of Classification Search ............... 710/10; 709/224, 223; 370/329
See application file for complete search history.

(56) References Cited

U.S. PATENT DOCUMENTS

| 5,754,954 | A | 5/1998 | Cannon et al. |
| 5,819,177 | A | 10/1998 | Vucetic et al. |
| 5,987,609 | A | 11/1999 | Hasebe |
| 6,088,457 | A | 7/2000 | Parkinson et al. |
| 6,215,994 | B1 | 4/2001 | Schmidt et al. |
| 6,308,061 | B1 | 10/2001 | Criss et al. |
| 6,441,747 | B1 | 8/2002 | Khair et al. |
| 6,549,770 | B1 | 4/2003 | Marran |
| 6,574,678 | B1 * | 6/2003 | Nykanen et al. ............... 710/10 |
| 6,587,684 | B1 | 7/2003 | Hsu et al. |
| 6,654,786 | B1 | 11/2003 | Fox et al. |
| 6,662,023 | B1 | 12/2003 | Helle |
| 6,731,942 | B1 | 5/2004 | Nageli |
| 6,981,137 | B2 | 12/2005 | Deo et al. |
| 7,065,347 | B1 | 6/2006 | Vikse et al. |
| 7,099,699 | B2 | 8/2006 | Jeong |
| 2001/0032193 | A1 | 10/2001 | Ferber |
| 2002/0059449 | A1 | 5/2002 | Wandel et al. |
| 2005/0089052 | A1 * | 4/2005 | Chen et al. .................. 370/401 |

FOREIGN PATENT DOCUMENTS

| CA | 2 318 293 A1 | 7/1999 |
| DE | 198 01 576 A1 | 7/1999 |
| EP | 0 757 502 A1 | 2/1997 |

(Continued)

*Primary Examiner*—Jason Cardone
*Assistant Examiner*—Adnan Mirza
(74) *Attorney, Agent, or Firm*—Bingham McCutchen LLP

(57) ABSTRACT

A method, system, and computer program product that provides the capability to manage, control, and reconfirm wireless devices remotely over a wireless network with acceptable reliability and security. A method for remotely managing a wireless device over a telecommunications network comprising a server and the wireless device, the method comprises the steps of establishing a communicative connection between the server and the wireless device over a signaling channel of the telecommunications network, transmitting a command from the server to the wireless device over the signaling network, and executing the command at the wireless device.

41 Claims, 6 Drawing Sheets

| | FOREIGN PATENT DOCUMENTS | | |
|---|---|---|---|
| EP | 0 757 502 A2 | 2/1997 |
| EP | 0 998 155 A | 5/2000 |
| EP | 1 170 969 A1 | 1/2002 |
| WO | 94 30023 A | 12/1994 |
| WO | 00 59225 A | 10/2000 |
| WO | WO 01/86985 | 11/2001 |

* cited by examiner

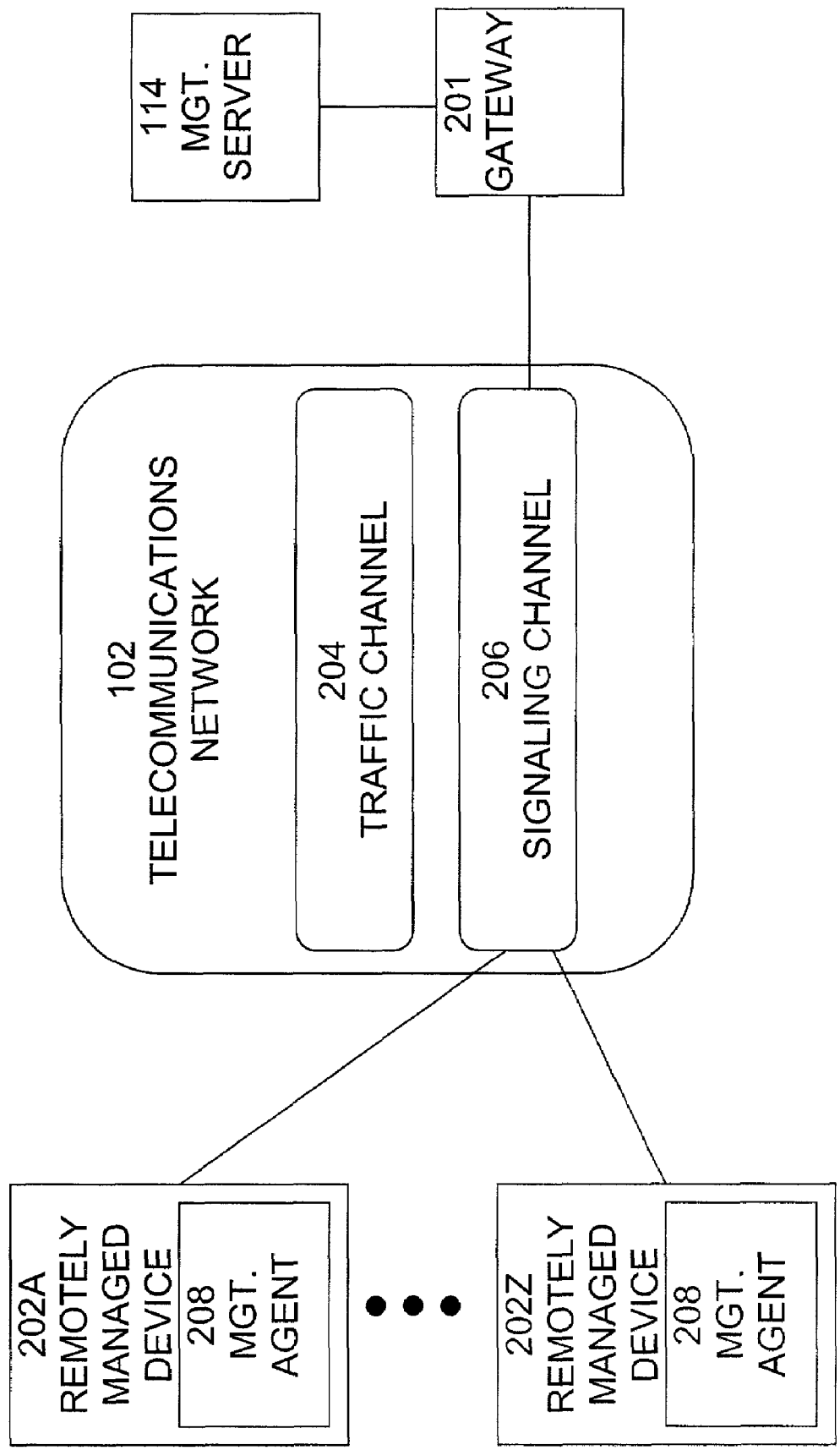

SYSTEM AND METHOD FOR WIRELESS DATA TERMINAL MANAGEMENT USING TELECOMMUNICATION SIGNALING NETWORK

CROSS-REFERENCE TO RELATED APPLICATIONS

This application is a continuation-in-part of U.S. application Ser. No. 09/925,536, filed Aug. 10, 2001, which claims the benefit of provisional application 60/251,034, filed Dec. 5, 2000.

FIELD OF THE INVENTION

The present invention relates to a system and method for providing remote over the air management of wireless data terminals over Common Channel Signaling System 7 (SS7/C7) and any application protocol that runs on SS7 such as SMS and Instant Massaging. Management includes over the air, locking/unlocking the terminal; zapping/deleting contents from the terminal; terminal password management; data application distribution and application configuration on the wireless terminal.

BACKGROUND OF THE INVENTION

Currently, there are various implemented and proposed protocols to manage, control, and reconfirm computer systems remotely over a network via a central console. Such protocols are designed for an environment in which the computer systems to be managed are connected to the central console by fixed wiring, such as twisted pair wire, coaxial cable, or fiber optic cable. Management and control methods for networks that utilize fixed wiring assume that the network is quite reliable. In addition, many protocols are designed for a controlled network environment, such as a local area network, in which the computing environment is secure. Such security may be provided by use of a firewall to connect the local area network to other networks.

However, networks utilizing fixed wiring are limited in that in mobile devices cannot be configured onto a fixed network and so cannot be utilized. In addition, in many situations, the installation of the fixed wiring may be expensive or infeasible. Wireless networks provide these capabilities that fixed networks lack. Thus, a need arises for a technique that will allow data terminals to be remotely managed, controlled, and reconfirmed using a wireless network. Network considerations in a wireless network are different that those in a fixed network. For example, wireless connections are not as reliable as fixed connections, due to interference and other reception difficulties. In addition, security considerations in a wireless network are different, in that wireless signals carrying data are much more subject to interception than are signals carrying data in a fixed network. Signaling networks in wireless telecommunications have been used for device activation/provisions, voice call set up/tear down and providing massaging service such as Short Message Service (SMS) and instant massaging service. However, a need arises for a technique that provides the capability for more advanced management of wireless devices, as well as the capability to control and reconfirm wireless devices remotely over a wireless network with acceptable reliability and security.

SUMMARY OF THE INVENTION

The present invention is a method, system, and computer program product that provides the capability to manage, control, and reconfirm wireless devices remotely over a wireless network with acceptable reliability and security. In one embodiment, the present invention is a method for remotely managing a wireless device over a telecommunications network comprising a server and the wireless device, the method comprising the steps of: establishing a communicative connection between the server and the wireless device over a signaling channel of the telecommunications network, transmitting a command from the server to the wireless device over the signaling network, and executing the command at the wireless device.

In one aspect of the present invention, the signaling channel of the telecommunications network comprises a Common Channel Signaling System 7 channel. The signaling channel of the telecommunications network may comprise a Short Message Service application or Instant massaging application. The transmitting step may comprise the step of transmitting the command to a management agent process executing on the wireless device. The transmitting step may comprise the step of transmitting the command to a management agent process executing on the wireless device in a Short Message Service message.

In one aspect of the present invention, the transmitting step comprises the step of transmitting the command to a management agent process executing on the wireless device. The connection may be established periodically or the connection may be established based on a threshold condition.

In one aspect of the present invention, the command comprises one of: enabling/disabling access of the wireless device to the server, enabling/disabling applications that may run on the wireless device, erasing all or part of contents of the wireless device, transmitting new commands and parameters to the wireless device, querying a current state of the wireless device, monitoring a level of a battery in the wireless device, monitoring a location of the wireless device in the wireless network, and reconfirming applications that may run on the wireless device.

In one aspect of the present invention, the method further comprises the step of transmitting information relating to execution of the command at the wireless device from the wireless device to the server. The information relating to execution of the command may be transmitted periodically or the information relating to execution of the command may be transmitted based on a threshold condition of the wireless device.

In one aspect of the present invention, the transmitting step comprises the steps of transmitting registration information relating to the wireless device from the wireless device to the server, verifying the registration information at the server, establishing a DCB for the wireless device at the server, placing a command for the wireless device in the DCB, delivering the command from the DCB to the wireless device, and executing the command at the wireless device.

In one aspect of the present invention, the delivering step comprises the steps of: establishing a connection between the wireless device and the server, transmitting a request for contents of the DCB from the wireless device to the server, and transmitting the contents of the DCB from the server to the wireless device. The connection may be established periodically or the connection may be established based on a threshold condition.

In one aspect of the present invention, the delivering step comprises the steps of: establishing a connection between the wireless device and the server, transmitting the contents of the DCB from the server to the wireless device without a request from the wireless device, and accepting the contents of the DCB at the wireless device. The connection may be established periodically or the connection may be established based on a threshold condition.

In one aspect of the present invention, the command comprises one of: enabling/disabling access of the wireless device to the server, enabling/disabling applications that may run on the wireless device, erasing all or part of contents of the wireless device, transmitting new commands and parameters to the wireless device, querying a current state of the wireless device, monitoring a level of a battery in the wireless device, and monitoring the location of the wireless device in the wireless network.

In one aspect of the present invention, the method further comprises the step of transmitting information relating to execution of the command at the wireless device from the wireless device to the server. The information relating to execution of the command may be transmitted periodically or the information relating to execution of the command may be transmitted based on a threshold condition of the wireless device.

In another embodiment, the present invention is a method for remotely managing a wireless device over a wireless network comprising the steps of: receiving registration information from the wireless device, verifying the received registration information, placing a command for the wireless device in a Device Control Box (DCB), and delivering the command to the wireless device.

In one aspect of the present invention, the delivering step comprises the steps of: establishing a connection with the wireless device, receiving a request for contents of the DCB from the wireless device, and transmitting the contents of the DCB to the wireless device. The connection may be established periodically or the connection may be established based on a threshold condition.

In one aspect of the present invention, the delivering step comprises the steps of establishing a connection with the wireless device and transmitting the contents of the DCB to the wireless device without a request from the wireless device. The connection may be established periodically or the connection may be established based on a threshold condition.

In one aspect of the present invention, the command execution comprises the step of: verifying the signature of the command with the signature of the device and only then executing the received command. The signature may comprise one or more of the following: encrypted keys, physical identity of the device, logical identity of the device, a mapping between the logical identity and physical identity of the device, a mapping between device ownership and the origin of the command or explicit authentication.

In one aspect of the present invention, the method further comprises the step of receiving information relating to execution of the command at the wireless device from the wireless device.

BRIEF DESCRIPTION OF THE DRAWINGS

The details of the present invention, both as to its structure and operation, can best be understood by referring to the accompanying drawings, in which like reference numbers and designations refer to like elements.

FIG. 2*a* is an exemplary block diagram of a wireless network system 200 incorporating the remote management technique of the present invention.

DETAILED DESCRIPTION OF THE INVENTION

Figure 1:
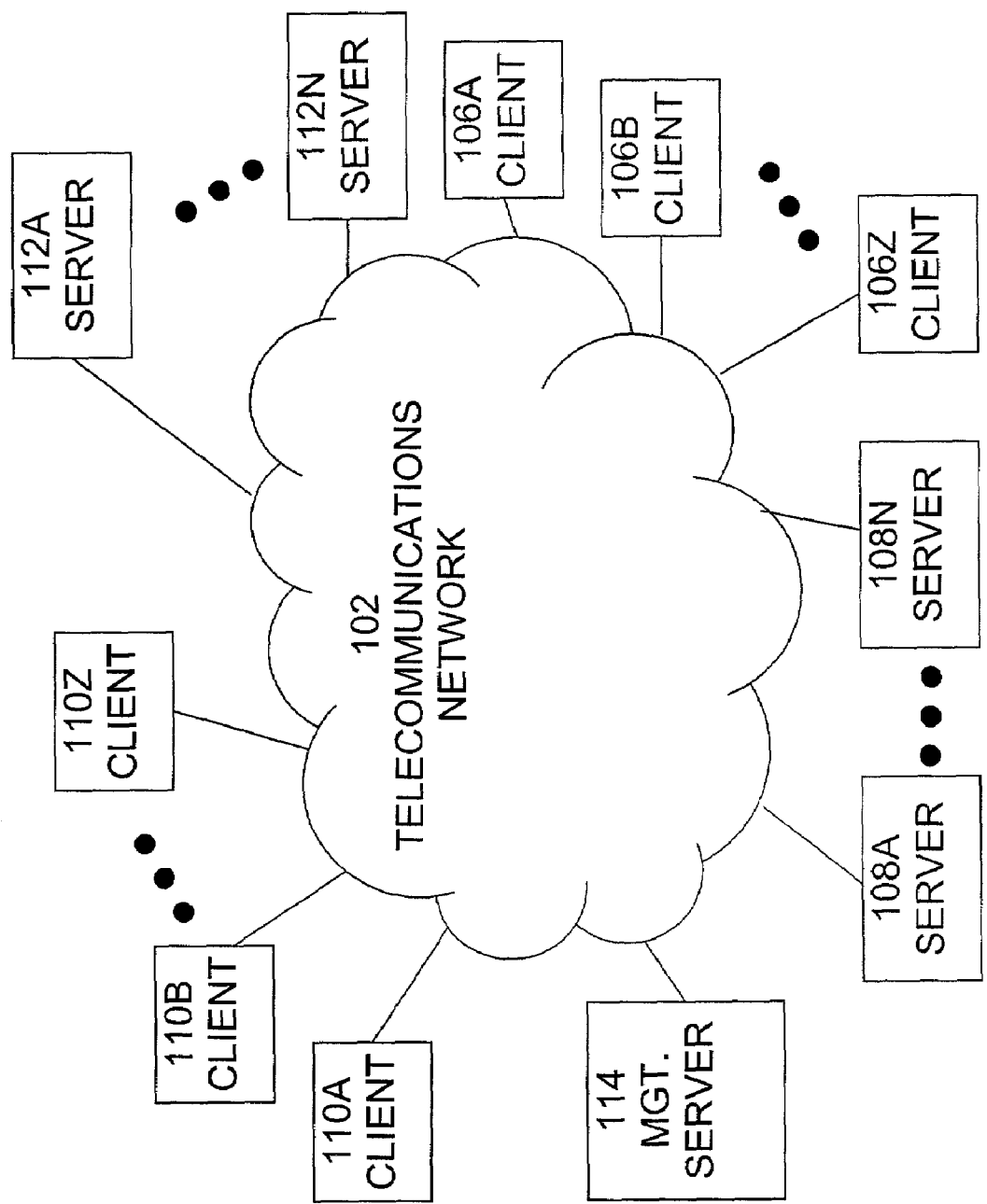
FIG. 1 is an exemplary block diagram of a network system in which the present invention may be implemented.

An exemplary block diagram of a network system 100 in which the present invention may be implemented is shown in FIG. 1. Network system 100 includes telecommunications network 102. Telecommunications network 102 provides communicative interconnection of a plurality of devices, such as client systems 106A-106Z and 110A-110Z and servers 108A-108N and 112A-112N. Telecommunications network 102 may include one or more wireless networks and/or one or more wire line networks. The transmission media in a wireless network is typically electromagnetic radiation, such as radio waves or light, while the transmission media in a wire line network is wire, such as copper wire, or the equivalent of wire, such as fiber optic cable. The wireless telecommunications networks included in telecommunications network 102 may include, for example, digital cellular telephone networks, such as Global System for Mobile Telecommunications (GSM) networks, Personal Communication System (PCS) networks, etc. The wire line telecommunications networks included in telecommunications network 102 may include, for example, the Public Switched Telephone Network (PSTN), as well as proprietary local and long distance telecommunications networks. In addition, telecommunications network 102 may include digital data networks, such as one or more local area networks (LANS), one or more wide area networks (WANS), or both LANS and WANS. One or more networks may be included in telecommunications network 102 and may include both public networks, such as the Internet, and private networks and may utilize any networking technology and protocol, such as Ether net, Token Ring, Transmission Control Protocol/Internet Protocol (TCP/IP), etc.

Client systems 106A-106Z and 110A-110Z may include any type of electronic data processing system or communication device. Examples of such electronic data processing system include personal computer systems, such as desktop or laptop computers, workstation computer systems, server computer systems, networks of computer systems, personal digital assistants (PDAs), wireless communications devices, such as cellular telephones, etc. In an embodiment in which the client systems are computer systems, the computer systems may connect directly to network 102, or the computer systems may connect indirectly to network 102 through one or more other networks, gateways, firewalls, etc. Likewise, the connection to network 102 may be wired, wireless, or a combination of wired and wireless. In an embodiment in which the client systems are other types of devices, such as PDAs or telephone devices, the connection to network 102 may be direct or indirect, wired, wireless, or a combination of wired and wireless, as is appropriate. Typically, the user interface of client systems 106A-106Z and 110A-110Z is a graphical user interface, but other interfaces may be used as well. For example, the client systems may include conventional landline telephones or cellular telephones communicatively connected to a touch-tone response unit or a voice response unit, which accepts touch-tone or voice commands and transmits them over network 102 and which receives responses over network 102, converts the received responses to audio, and transmits the received responses to the client systems.

Management server 114 is also communicatively connected to network 102. Management server 114 interfaces with telecommunications network 102 and with multiple servers and clients that are connected to telecommunications network 102 and provides remote management of those servers and clients over telecommunications network 102.

An exemplary block diagram of a wireless network system 200 incorporating the remote management technique of the present invention is shown in FIG. 2a. System 200 includes telecommunications network 102, management server 114, gateway 201, and a plurality of remotely managed devices 202A-202Z. Telecommunications network 102 includes a traffic channel 204 and a signaling channel 206. Traffic channel 204 carries telecommunications traffic, such as telephone voice and data calls. Signaling network 206 carries signaling data relating to the telecommunications traffic and the configuration of telecommunications network 102. For example, signaling channel 206 may include the well-known Common Channel Signaling System 7 (SS7).

Remotely managed devices 202A-202Z may include both client and server systems shown in FIG. 1. Each remotely manage device includes a management agent 208, which is typically a software process that provides the capability for management server 114 to remotely manage the device. Management server 114 communicates with the each remotely managed device using signaling channel 206 of telecommunications network 102. Management server 114 is communicatively connected to signaling channel 206 via gateway 201. The information that is communicated is directed to or originated from the management agent that is running on the device. Management server 114 typically transmits commands to each remotely managed device. These commands are directed to the management agent running on the device and are then carried out on the device under the control of the management agent. Typical commands that may be transmitted from management server 114 are enabling/disabling access of the remotely managed device to the server, enabling/disabling applications that may run on the remotely managed device, erasing all or part of the device contents, such as programs and data, transmitting new commands and parameters to a device, querying the current state of the device, etc. Some commands cause the remotely managed device to transmit data to management server 114. In this situation, the management agent on the device originates a transmission of the data to management server 114 over telecommunications network 102.

A signaling system provides three basic functions in a telecommunications network:

Network supervision—the status of lines and circuits is monitored to see if they are busy, idle, or requesting service.

Alerting—indicates the arrival of an incoming call.

Addressing—transmitting routing and destination signal over the network.

Older signaling systems were "inband", that is, the signaling signals were transmitted along with and on the same circuits as the voice signals in the telephone network. This was inefficient and prone to fraud. Newer signaling system are "out-of-band", that is, the signaling signals are transmitted in a network that is separate from the circuits that carry the voice signals in the telephone network. This improves efficiency and fraud resistance of the telecommunications network.

One example of an out-of-band signaling network that is in widespread use is the Common Channel Signaling System 7 (SS7). SS7 is a global standard for telecommunications defined by the International Telecommunication Union (ITU) Telecommunication Standardization Sector (ITU-T). The standard defines the procedures and protocol by which network elements in the public switched telephone network (PSTN) exchange information over a digital signaling network to effect wireless (cellular) and wire line call setup, routing and control.

SS7 utilizes a signaling network that includes physical communication channels, as well as protocols. The protocols provide functions such as destination routing, data fields, variable length messages, etc. A major characteristic of SS7 is its layered functional structure. The SS7 protocol includes of a number of sub-protocols:

Message Transfer Part (MTP)—provides functions for basic routing of signaling messages between signaling points.

Signaling Connection Control Part (SCCP)—provides additional routing and management functions for transfer of messages other than call setup between signaling points.

Integrated Services Digital Network User Part (ISUP)—provides for transfer of call setup information between signaling points.

Transaction Capabilities Application Part (TCAP)—provides for transfer of non-circuit related signaling information between signaling points.

SS7 provides fast call setup via high-speed circuit-switched connections. In addition, SS7 provides transaction capabilities that deal with remote database interactions.

The physical communication channels of a signaling networks, such as SS7, include signaling points, which are interconnected by signaling links. The signaling network provides a bi-directional transport facility for messages between connected devices, such as the wireless terminals and any data server. The data servers are connected to signaling networks via Gateways such as SMS-C (Short Message Service Center) Gateway.

Wireless data terminals are the devices that provide environment for deploying/running data and voice applications. Such devices are active on the network and always reachable via signaling channel. Such device can roam anywhere in the world, as far as they are connected to wireless network, data server located in any enterprise can deliver information to these devices. Among the data that can be transported using a signaling network, such as SS7, are messages known as Short Message Service (SMS) messages. SMS messages are placed onto the signaling network by a Short Message Service Center (SMS-C). For example, gateway 201, shown in FIG. 2a, may be an SMS-C.

Typically, the messages sent using SMS can be up to 160 characters of text in length. Those 160 characters can include words or numbers or an alphanumeric combination. Non-text based short messages (for example, in binary format) are also supported. These are used for ringtones and logos services for instance.

The Short Message Service is a store and forward service, in other words, short messages are not sent directly from sender to recipient, but always via an SMS Center instead.

Each mobile telephone network that supports SMS has one or more massaging centers to handle and manage the short messages.

The Short Message Service features confirmation of message delivery. This means that unlike paging, users do not simply send a short message and trust and hope that it gets delivered. Instead the sender of the short message can receive a return message back notifying them whether the short message has been delivered or not.

Short messages can be sent and received simultaneously with voice, Data, and Fax calls. This is possible because whereas voice, Data, and Fax calls take over a dedicated radio channel for the duration of the call, short messages travel over and above the radio channel using the signaling path. As such, users of SMS rarely if ever get a busy or engaged signal as they can do during peak network usage times.

Ways of sending multiple short messages are available. SMS concatenation (stringing several short messages together) and SMS compression (getting more than 160 characters of information within a single short message) have been defined and incorporated in the SMS standards.

Figure 2B:
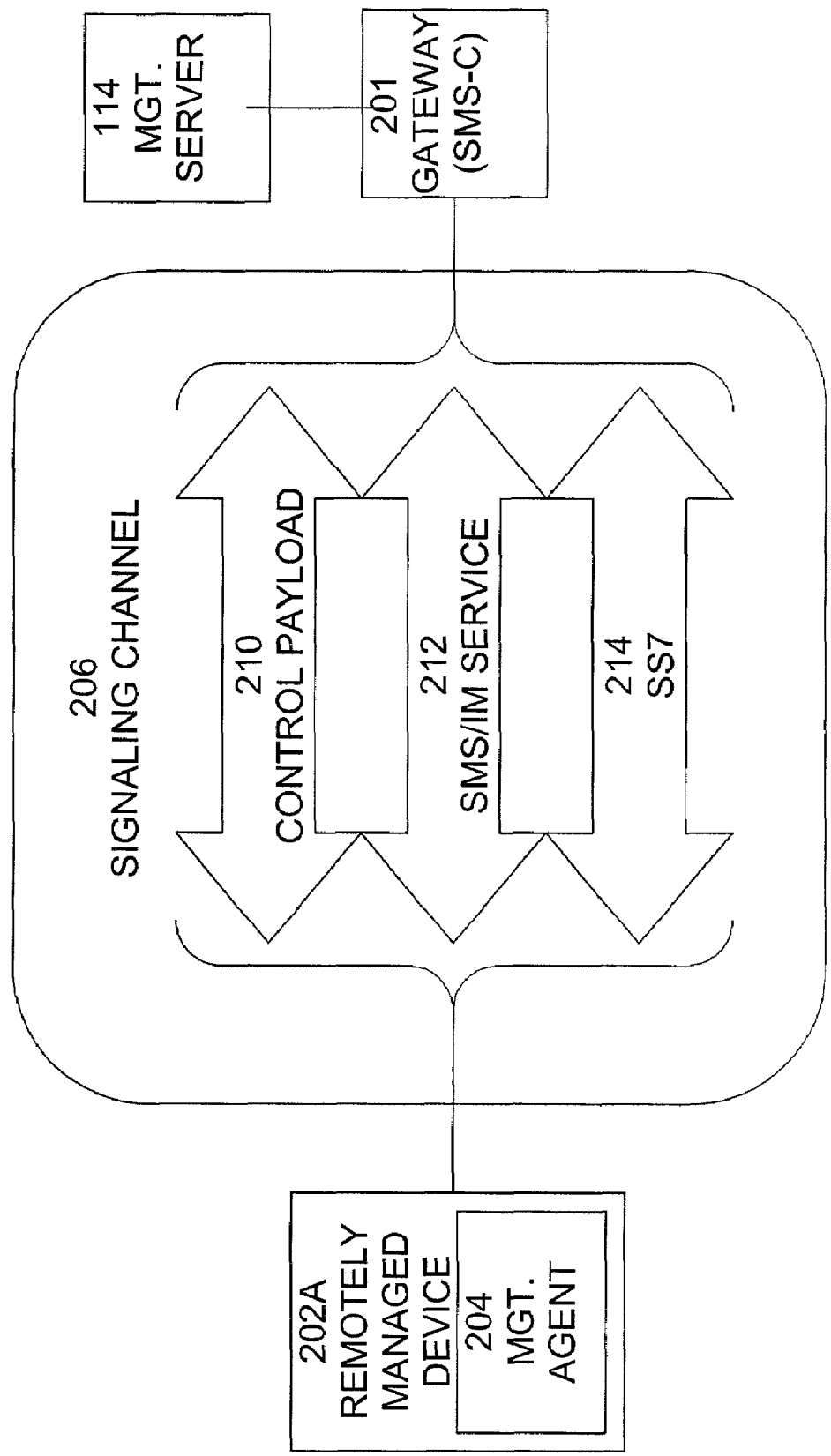
FIG. 2*b* is an exemplary block diagram of the use of a signaling channel shown in FIG. 2*a* in implementing the present invention.

The use of the SS7 signaling system and Short Message Service in implementing the present invention is shown in FIG. 2b. As shown, a management server 114 communicates a control payload 210 with a remotely managed device, such as remotely managed device 202A. Control payload 210 includes information that is used to control aspects of the operation of remotely managed device 202A, such as commands to the device, status information from the device, etc. Control payload 210 is carried in one or more SMS messages to remotely managed device 202A. Management server 114 generates messages that include the information to be included in control payload 210 and transmits these messages to gateway 201. When SMS is used gateway 201 includes a Short Message Service Center (SMS-C) The SMS-C formats the messages received from management server 114 into SMS messages that may be sent using the Short Message Service 212, and transmits the messages using service 212. The SMS messages are transported using the signaling network, such as SS7 signaling network 214 and delivered to management agent 204 of remotely managed device 202A, which extracts control payload 210 from the message.

Control payload 210 may also include information from remotely managed device 202A, which is carried in one or more SMS messages from remotely managed device 202A to management server 114. Remotely managed device 202A generates messages that include the information to be included in control payload 210, formats the messages into SMS messages that may be sent using the Short Message Service 212, and transmits the messages using service 212. The SMS messages are transported using the signaling network, such as SS7 signaling network 214 and delivered, via the SMS-C of gateway 201, to management server 114, which extracts control payload 210 from the message.

Figure 3:
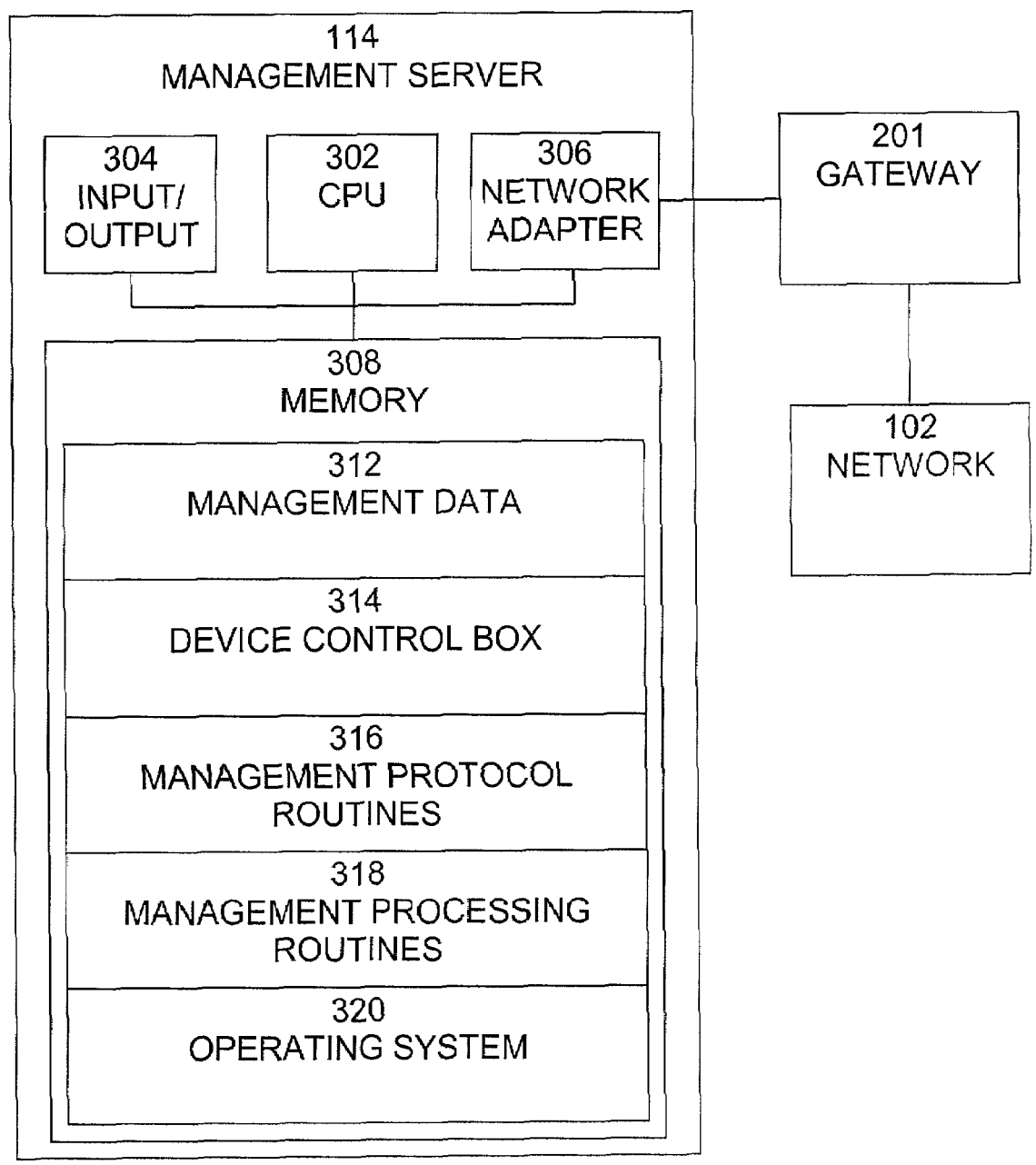
FIG. 3 is an exemplary block diagram of management server shown in FIG. 1.

An exemplary block diagram of management server 114 is shown in FIG. 3. Management server 114 is typically a programmed general-purpose computer system, such as a personal computer, workstation, server system, and minicomputer or mainframe computer. Management server 114 includes processor (CPU) 302, input/output circuitry 304, network adapter 306, and memory 308. CPU 302 executes program instructions in order to carry out the functions of the present invention. Typically, CPU 302 is a microprocessor, such as an INTEL PENTIUM® processor, but may also be a minicomputer or mainframe computer processor. FIG. 3 illustrates an embodiment in which management server 114 is implemented as a single processor computer system. However, the present invention contemplates embodiments in which management server 114 is implemented as a multi-processor system, in which multiple processors 302A-402N share system resources, such as memory 308, input/output circuitry 304, and network adapter 306. The present invention also contemplates embodiments in which management server 114 is implemented as a plurality of networked computer systems, which may be single-processor computer systems, multi-processor computer systems, or a mix thereof.

Input/output circuitry 304 provides the capability to input data to, or output data from, computer system 300. For example, input/output circuitry may include input devices, such as keyboards, mice, touchpads, trackballs, scanners, etc., output devices, such as video adapters, monitors, printers, etc., and input/output devices, such as, modems, etc. Network adapter 306 interfaces management server 114 with gateway 201, which communicatively connects management server 114 with signaling channel 206 of telecommunications network 102, shown in FIG. 1.

Memory 308 stores program instructions that are executed by, and data that are used and processed by, CPU 302 to perform the functions of the present invention. Memory 308 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 308 includes management data 312, mailbox 314, management protocol routines 316, management processing routines 318, and operating system 320. Management data 312 includes data relating to each remotely managed device being managed by management server 114. Management data 312 includes data such as the current state and identity of each remotely managed device. This data is obtained from the management agent running on each remotely managed device. Mailbox 314 stores commands that are to be delivered to remotely managed devices so that the devices can retrieve the commands. Management protocol routines 316 include software that implements the protocols that communicate the remote management commands to devices over telecommunications network 102. Management processing routines 318 include software that receives or determines the remote management commands that are to be communicated to the remotely managed devices by management protocol routines 314. Operating system 320 provides overall system functionality.

Figure 4:
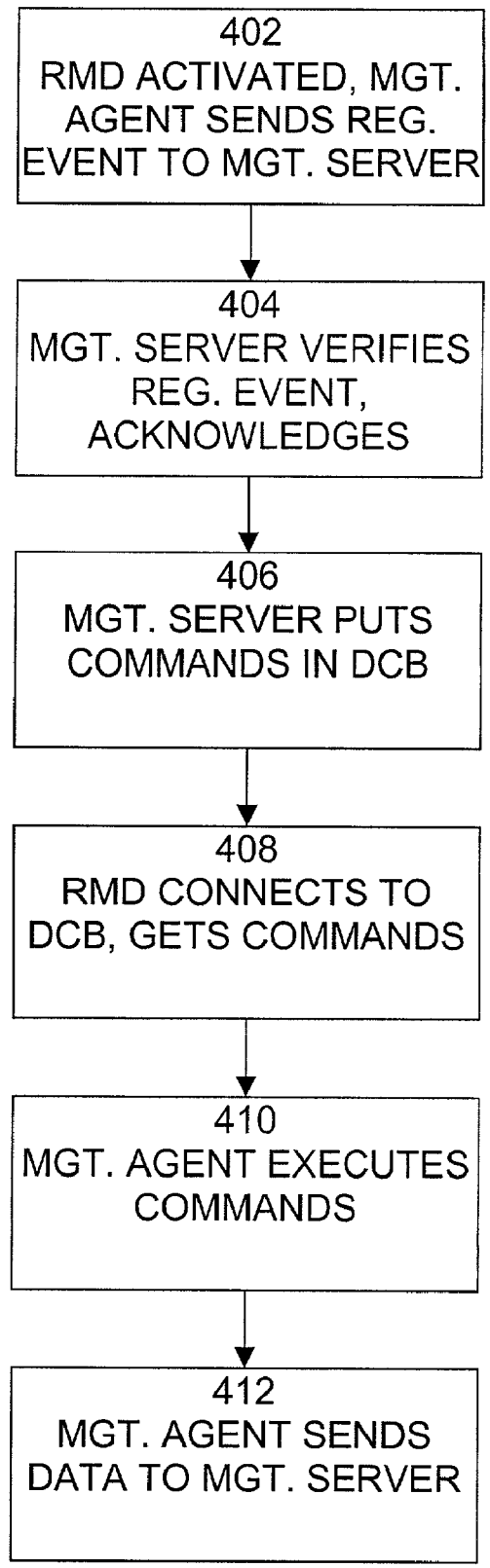
FIG. 4 is an exemplary flow diagram of a process for remotely managing devices over a wireless network, according to the present invention.
Figure 5:
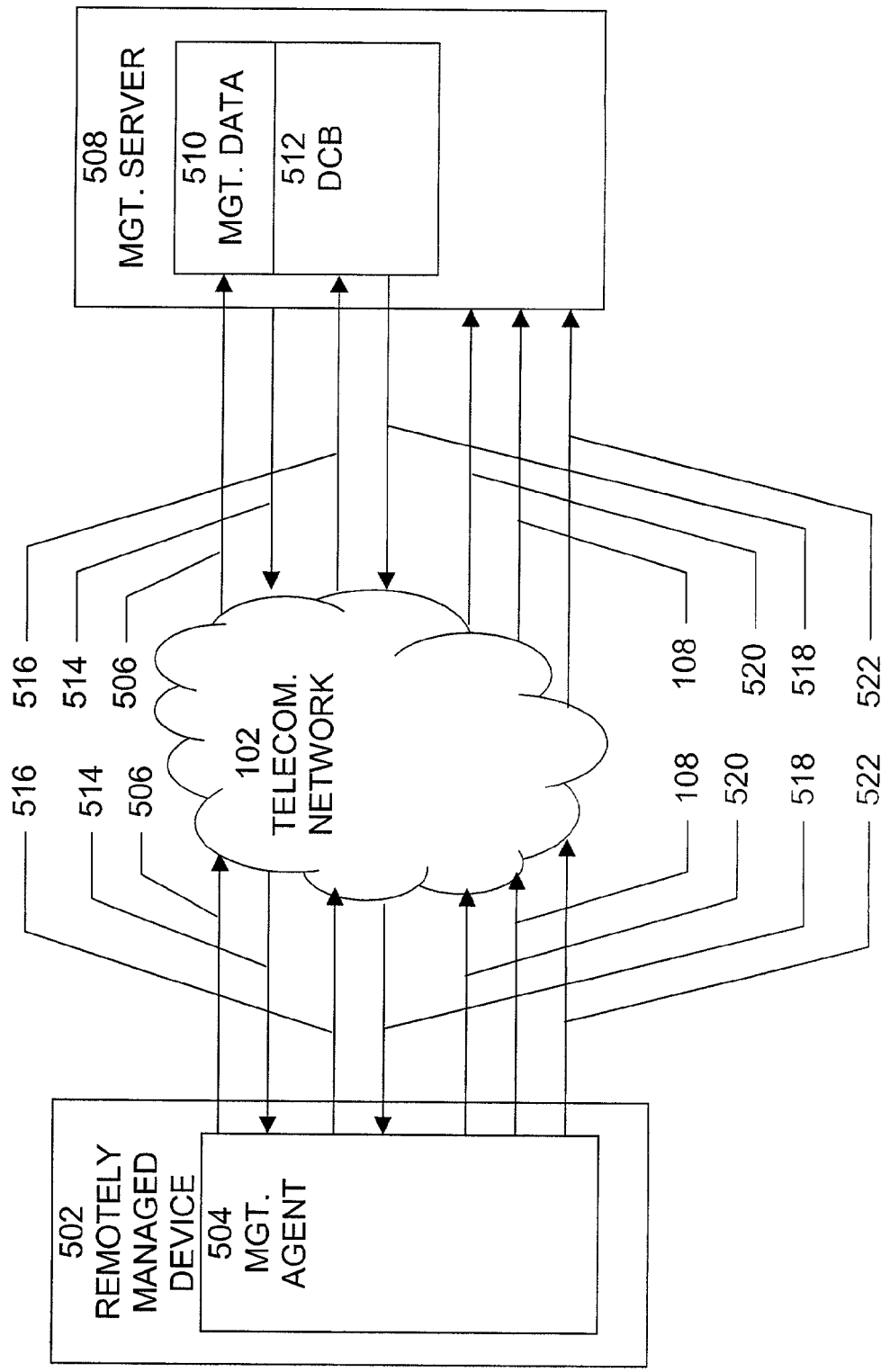
FIG. 5 is a data flow diagram of the operation of the process shown in FIG. 4.

A process 400 for remotely managing devices over a signaling channel, according to the present invention, is shown in FIG. 4. It is best viewed in conjunction with FIG. 5, which is a data flow diagram of the operation of process 400. Process 400 begins with step 402, in which a remotely managed device, such as remotely managed device 502, is activated. Device 502 runs management agent 504, which transmits registration event message 506 to management server 508. Registration event message 506 includes information identifying device 502 and information relating to the state of the device. Registration event message 506, and all communications between device 502 and management server 508, is transmitted using a security protocol that ensures that only authorized remotely managed devices, running authorized management agents, can communicate with management server 506. Preferably, the security mechanism used is based on public key encryption, but any other security mechanism that provides adequate security may also be used.

In step 404, the management server verifies the registration event by checking the validity of the information contained in registration event message 506. In particular, management server 508 verifies the identity of remotely managed device 502. Upon verification of device 502, management server 508 registers device 502 by storing registration information relating to device 502 in management data 510. The registration information includes the identity and state of device 502. Management server 508 establishes a mailbox 512 for the newly registered remotely managed device 502. Management server 506 also transmits a message 514 acknowledging successful registration of remotely managed device 502 to the device.

In step 406, management server 508 places commands intended for remotely managed device 502 in DCB 512. Such commands may include, for example:
  enabling/disabling access of the remotely managed device to the server (Lock/Unlock the device)
  enabling/disabling applications that may run on the remotely managed device
  erasing all or part of the device contents, such as programs and data
  transmitting new commands and parameters to a device
  querying the current state of the device
  monitoring the level of the battery in the device
  monitoring the location of the device in the wireless network, including foreign networks
  verifying that the command signature is in agreement with the signature of the device
  Reconfirming applications that may run on the remotely managed device In steps 408 and 410, the commands stored in DCB 512 are delivered to the remotely managed device. In particular, in step 408, a connection 516 is established between management agent 504, running on remotely managed device 502, and management server 508. Upon connection 516 being established, the commands that were stored in DCB 512 in step 406 are transmitted 518 to device 502. This protocol is applicable to both push and pull devices. A pull devices is a device that must request data before the data is transmitted to the device. A push device is a device to which data is transmitted without the device requesting the data, but which will nevertheless accept the data. In an embodiment in which remotely managed device 502 is a pull device, the management agent running on device 502 will occasionally connect to management server 508 and request the commands in DCB 512. In an embodiment in which remotely managed device 502 is a push device, management server 508 will occasionally connect to remotely managed device 502 and transmit the commands in DCB 512 to management agent 504. In both embodiments, the connections may be made periodically, based on some defined time interval, or they may be made based on predefined threshold conditions.

In step 410, management agent 504 executes the retrieved commands and transmits a notification message 520 that informs management server 508 of the results of executing each command. In addition, if one or more of the commands were to monitor parameters of remotely managed device 502, then, in step 412, management agent 504 will transmit the monitored information 522 to management server 508. The transmission may be periodic, based on some defined time interval, or they may be based on the values of certain parameters of device 502 in relation to predefined threshold conditions. The time intervals or threshold conditions may be inherent in device 502, or they may be transmitted as parameters or data related to the commands that were retrieved by device 502.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for remotely managing a wireless device over a telecommunications network comprising a server and the wireless device, the method comprising the steps of:
  establishing from the server to the wireless device a communicative connection between the server and the wireless device over a signaling channel of the telecommunications network, wherein the communicative connection is established based on a threshold condition;
  transmitting a command from the server to the wireless device over the signaling network, wherein the wireless device executes commands including:
  enabling access to user-specific data used by application software on the wireless device requiring user interaction locally on the wireless device, enabling the application software, erasing at least a portion of the user-specific data, transmitting new application software and new user-specific data to the wireless device, querying a current state of the wireless device, and reconfiguring the application software,
  disabling access to user-specific data used by application software on the wireless device requiring user interaction locally on the wireless device, and
  disabling the application software;
  executing the command at the wireless device after verifying at the wireless device that a signature sent by the server that is an origin of the command and signature of the device are in agreement; and
  transmitting information relating to execution of the command at the wireless device from the wireless device to the server.

2. The method of claim 1, wherein the signaling channel of the telecommunications network comprises a Common Channel Signaling System 7 channel.

3. The method of claim 2, wherein the signaling channel of the telecommunications network comprises a Short Message Service.

4. The method of claim 3, wherein the transmitting step comprises the step of:
transmitting the command to a management agent process executing on the wireless device.

5. The method of claim 4, wherein the transmitting step comprises the step of:
transmitting the command to a management agent process executing on the wireless device in a Short Message Service message.

6. The method of claim 3, wherein the transmitting step comprises the step of:
transmitting the command to a management agent process executing on the wireless device.

7. The method of claim 6, further comprising the step of:
transmitting information relating to execution of the command at the wireless device from the wireless device to the server.

8. The method of claim 7, wherein the information relating to execution of the command is transmitted periodically.

9. The method of claim 7, wherein the information relating to execution of the command is transmitted based on a threshold condition of the wireless device.

10. The method of claim 3, wherein the transmitting step comprises the step of:
transmitting registration information relating to the wireless device from the wireless device to the server;
verifying the registration information at the server;
establishing a DCB for the wireless device at the server;
placing a command for the wireless device in the DCB; and
delivering the command from the DCB to the wireless device.

11. The method of claim 10, wherein the delivering step comprises the steps of:
establishing a connection between the wireless device and the server;
transmitting a request for contents of the DCB from the wireless device to the server; and
transmitting the contents of the DCB from the server to the wireless device.

12. The method of claim 10, wherein the delivering step comprises the steps of:
establishing a connection between the wireless device and the server;
transmitting the contents of the DCB from the server to the wireless device without a request from the wireless device; and
accepting the contents of the DCB at the wireless device.

13. The method of claim 10, further comprising the step of:
transmitting information relating to execution of the command at the wireless device from the wireless device to the server.

14. The method of claim 13, wherein the information relating to execution of the command is transmitted periodically.

15. The method of claim 14, wherein the information relating to execution of the command is transmitted based on a threshold condition of the wireless device.

16. A system for remotely managing a wireless device over a wireless network, the system comprising:
a processor operable to execute computer program instructions; and
a memory operable to store computer program instructions executable by the processor, for performing the steps of:
establishing from the server to the wireless device a communicative connection between the server and the wireless device over a signaling channel of the telecommunications network, wherein the communicative connection is established based on a threshold condition;
transmitting a command from the server to the wireless device over the signaling network, wherein the wireless device executes commands including:
enabling access to user-specific data used by application software on the wireless device requiring user interaction locally on the wireless device, enabling the application software, erasing at least a portion of the user-specific data, transmitting new application software and new user-specific data to the wireless device, querying a current state of the wireless device, and reconfirming the application software,
disabling access to user-specific data used by application software on the wireless device requiring user interaction locally on the wireless device, and
disabling the application software;
executing the command at the wireless device after verifying at the wireless device that a signature sent by the server that is an origin of the command and signature of the device are in agreement; and
transmitting information relating to execution of the command at the wireless device from the wireless device to the server.

17. The system of claim 16, wherein the signaling channel of the telecommunications network comprises a Common Channel Signaling System 7 channel.

18. The system of claim 17, wherein the signaling channel of the telecommunications network comprises a Short Message Service.

19. The system of claim 18, wherein the transmitting step comprises the step of:
transmitting the command to a management agent process executing on the wireless device.

20. The system of claim 19, wherein the transmitting step comprises the step of:
transmitting the command to a management agent process executing on the wireless device in a Short Message Service message.

21. The system of claim 18, wherein the transmitting step comprises the step of:
transmitting the command to a management agent process executing on the wireless device.

22. The system of claim 21, further comprising the step of:
transmitting information relating to execution of the command at the wireless device from the wireless device to the server.

23. The system of claim 22, wherein the information relating to execution of the command is transmitted periodically.

24. The system of claim 22, wherein the information relating to execution of the command is transmitted based on a threshold condition of the wireless device.

25. The system of claim 18, wherein the transmitting step comprises the step of:
receiving registration information from the wireless device;
verifying the received registration information;
placing a command for the wireless device in a DCB; and
delivering the command to the wireless device.

26. The system of claim 25, wherein the delivering step comprises the steps of:
    establishing a connection with the wireless device;
    receiving a request for contents of the DCB from the wireless device; and
    transmitting the contents of the DCB to the wireless device.

27. The system of claim 25, wherein the delivering step comprises the steps of:
    establishing a connection with the wireless device; and
    transmitting the contents of the DCB to the wireless device without a request from the wireless device.

28. The system of claim 25, further comprising the step of:
    receiving information relating to execution of the command at the wireless device from the wireless device.

29. A computer program product for remotely managing a wireless device over a wireless network, comprising:
    a computer readable medium;
    computer program instructions, recorded on the computer readable medium, executable by a processor, for performing the steps of
    establishing from the server to the wireless device a communicative connection between the server and the wireless device over a signaling channel of the telecommunications network, wherein the communicative connection is established based on a threshold condition;
    transmitting a command from the server to the wireless device over the signaling network, wherein the wireless device executes commands including:
    enabling access to user-specific data used by application software on the wireless device requiring user interaction locally on the wireless device, enabling the application software, erasing at least a portion of the user-specific data, transmitting new application software and new user-specific data to the wireless device, querying a current state of the wireless device, and reconfirming the application software,
    disabling access to user-specific data used by application software on the wireless device requiring user interaction locally on the wireless device, and
    disabling the application software;
    executing the command at the wireless device after verifying at the wireless device that a signature sent by the server that is an origin of the command and signature of the device are in agreement; and
    transmitting information relating to execution of the command at the wireless device from the wireless device to the server.

30. The computer program product of claim 29, wherein the signaling channel of the telecommunications network comprises a Common Channel Signaling System 7 channel.

31. The computer program product of claim 30, wherein the signaling channel of the telecommunications network comprises a Short Message Service.

32. The computer program product of claim 31, wherein the transmitting step comprises the step of:
    transmitting the command to a management agent process executing on the wireless device.

33. The computer program product of claim 32, wherein the transmitting step comprises the step of:
    transmitting the command to a management agent process executing on the wireless device in a Short Message Service message.

34. The computer program product of claim 31, wherein the transmitting step comprises the step of:
    transmitting the command to a management agent process executing on the wireless device.

35. The computer program product of claim 34, further comprising the step of:
    transmitting information relating to execution of the command at the wireless device from the wireless device to the server.

36. The computer program product of claim 35, wherein the information relating to execution of the command is transmitted periodically.

37. The computer program product of claim 35, wherein the information relating to execution of the command is transmitted based on a threshold condition of the wireless device.

38. The computer program product of claim 31, wherein the transmitting step comprises the step of:
    receiving registration information from the wireless device;
    verifying the received registration information;
    placing a command for the wireless device in a DCB; and
    delivering the command to the wireless device.

39. The computer program product of claim 38, wherein the delivering step comprises the steps of:
    establishing a connection with the wireless device;
    receiving a request for contents of the DCB from the wireless device; and
    transmitting the contents of the DCB to the wireless device.

40. The computer program product of claim 38, wherein the delivering step comprises the steps of:
    establishing a connection with the wireless device; and
    transmitting the contents of the DCB to the wireless device without a request from the wireless device.

41. The computer program product of claim 38, further comprising the step of:
    receiving information relating to execution of the command at the wireless device from the wireless device.

* * * * *

UNITED STATES PATENT AND TRADEMARK OFFICE
CERTIFICATE OF CORRECTION

PATENT NO.         : 7,343,408 B2
APPLICATION NO. : 10/022902
DATED                 : February 20, 2008
INVENTOR(S)       : Rakesh Kushwaha and Badri Nath Page 1 of 1

It is certified that error appears in the above-identified patent and that said Letters Patent is hereby corrected as shown below:

On the Title Pg, Item (57) Abstract, line 2, change "reconfirm" to --reconfigure--.
Col. 1, line 31, change "reconfirm" to --reconfigure--.
Col. 1, line 51, change "reconfirmed" to --reconfigured--.
Col. 1, line 65, change "reconfirm" to --reconfigure--.
Col. 2, line 5, change "reconfirm" to --reconfigure--.
Col. 2, line 41, change "reconfirming" to --reconfiguring--.
Col. 9, line 39, change "Reconfirming" to --Reconfiguring--.
Claim 16, line 23, change "reconfirming" to --reconfiguring--.
Claim 29, line 22, change "reconfirming" to --reconfiguring--.

Signed and Sealed this

Twentieth Day of October, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,343,408 B2 | Page 1 of 1 |
| APPLICATION NO. | : 10/022902 | |
| DATED | : February 20, 2008 | |
| INVENTOR(S) | : Rakesh Kushwaha and Badri Nath | |

It is certified that error appears in the above-identified patent and that said Letters Patent is hereby corrected as shown below:

On the Title Pg, Item (57) Abstract, line 2, change "reconfirm" to --reconfigure--.
Col. 1, line 31, change "reconfirm" to --reconfigure--.
Col. 1, line 51, change "reconfirmed" to --reconfigured--.
Col. 1, line 65, change "reconfirm" to --reconfigure--.
Col. 2, line 5, change "reconfirm" to --reconfigure--.
Col. 2, line 41, change "reconfirming" to --reconfiguring--.
Col. 9, line 39, change "Reconfirming" to --Reconfiguring--.
Col. 12, Claim 16, line 23, change "reconfirming" to --reconfiguring--.
Col. 13, Claim 29, line 22, change "reconfirming" to --reconfiguring--.

This certificate supersedes the Certificate of Correction issued October 20, 2009.

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,343,408 B2  Page 1 of 1
APPLICATION NO. : 10/022902
DATED : March 11, 2008
INVENTOR(S) : Rakesh Kushwaha and Badri Nath It is certified that error appears in the above-identified patent and that said Letters Patent is hereby corrected as shown below:

On the Title Pg, Item (57) Abstract, line 2, change "reconfirm" to --reconfigure--.
Col. 1, line 31, change "reconfirm" to --reconfigure--.
Col. 1, line 51, change "reconfirmed" to --reconfigured--.
Col. 1, line 65, change "reconfirm" to --reconfigure--.
Col. 2, line 5, change "reconfirm" to --reconfigure--.
Col. 2, line 41, change "reconfirming" to --reconfiguring--.
Col. 9, line 39, change "Reconfirming" to --Reconfiguring--.
Col. 12, Claim 16, line 23, change "reconfirming" to --reconfiguring--.
Col. 13, Claim 29, line 22, change "reconfirming" to --reconfiguring--.

This certificate supersedes the Certificates of Correction issued October 20, 2009 and November 10, 2009.

Signed and Sealed this

Fourth Day of May, 2010

David J. Kappos
*Director of the United States Patent and Trademark Office*